United States Patent
Baszucki

(10) Patent No.: US 9,229,605 B2
(45) Date of Patent: Jan. 5, 2016

(54) GEOMETRIC ASSEMBLY

(71) Applicant: David Baszucki, Portola Valley, CA (US)

(72) Inventor: David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 192 days.

(21) Appl. No.: 13/658,172

(22) Filed: Oct. 23, 2012

(65) Prior Publication Data

US 2014/0115511 A1    Apr. 24, 2014

(51) Int. Cl.
   *G06T 19/20*   (2011.01)
   *G06F 3/048*   (2013.01)
   *G06T 19/00*   (2011.01)

(52) U.S. Cl.
   CPC ............... *G06F 3/048* (2013.01); *G06T 19/20* (2013.01); *G06T 19/00* (2013.01)

(58) Field of Classification Search
   CPC ........ G06F 3/0486; G06T 19/00; G06T 19/22
   USPC .................................................. 715/700–866
   See application file for complete search history.

(56) References Cited

U.S. PATENT DOCUMENTS

| | | | | |
|---|---|---|---|---|
| 5,886,692 | A * | 3/1999 | Brewer et al. | 715/723 |
| 6,362,842 | B1 * | 3/2002 | Tahara et al. | 715/856 |
| 8,411,107 | B2 * | 4/2013 | Schneider et al. | 345/619 |
| 8,683,363 | B2 * | 3/2014 | Reid et al. | 715/769 |
| 2008/0010041 | A1 * | 1/2008 | McDaniel | 703/1 |
| 2008/0307359 | A1 * | 12/2008 | Louch et al. | 715/835 |
| 2009/0113330 | A1 * | 4/2009 | Garrison et al. | 715/769 |
| 2011/0029934 | A1 * | 2/2011 | Locker et al. | 715/863 |
| 2011/0087479 | A1 * | 4/2011 | Baszucki et al. | 703/22 |
| 2011/0196864 | A1 * | 8/2011 | Mason et al. | 707/728 |

* cited by examiner

*Primary Examiner* — Jordany Nunez
*Assistant Examiner* — Daniel Samwell
(74) *Attorney, Agent, or Firm* — Donald R. Boys; Central Coast Patent Agency, Inc.

(57) ABSTRACT

A drawing system has software (SW) providing tools to enable a user to create geometric objects in a display, and to select and drag the objects in the display. An assembly engine is a part of the SW, and monitors properties of objects and movement of objects in the display. The assembly engine monitors features and properties of a first object selected and dragged, and features and properties of second objects in the display, determines compatible geometric features that might be joined in assembly between the first and second objects, and upon compatible features for join being moved within a preprogrammed threshold distance (TD) in the display, affects a join operation, bringing the compatible features of the first and the second object together in an assembly and redrawing the assembly.

12 Claims, 8 Drawing Sheets

GEOMETRIC ASSEMBLY

BACKGROUND OF THE INVENTION

1. Field of the Invention

The present invention is in the technical area of image generation and display, and pertains more particularly to a system and methods for joining elements in assembly to create images of articulated apparatus.

2. Description of Related Art

It is well known in the imaging arts to display images using software executing on computerized appliances. Audio-video renditions, cartoons, movies, PowerPoint presentations and the like are examples of such imaging techniques. It is also well-known to create images using a drawing program for any of a variety of purposes. Programs are commercially available, for example, for machine designers, architects and the like to create drawings of machine and assembly views of machines from the individual elements.

There are broadly two sorts of drawing programs, termed raster and vector (object-oriented). In a raster program, one moves a cursor in a display, employing, for example, a trackball or a pointer device like a computer mouse, and the software follows the movements, and alters the display of pixels in the image in the path of the cursor. The cursor in such a program, sometimes called a Paint program, may be implemented as a point object, a broad brush, an eraser, or any of a broad variety of other shapes and effects as the cursor moves and pixels are programmed.

Raster images are pixel matrices, and as such, may be edited by erasure, group selection and movement or group effect editing. Such programs are mostly useful in artistic endeavors and not so useful in technical areas like machine design.

The other broad category of computer aided-drawing programs is the category of vector programs, also called object-oriented programs. In this sort of program geometric elements are defined in the program, such as lines, arcs, rectangles, circles, and many other geometric shapes. One may select in a tool bar a line tool, for example, then click at a first point on the display and drag to a second point and release. The programming is such that a line appears between the two points. The user may select a default line weight and color, and once the line is displayed, the user may select the line by any of a variety of ways, and cause the line to display handles at the end points, or even at other points along the line. The user may them grab a handle (by click and drag) and lengthen, shorten or reorient the line.

Further the user may select an arc tool or a circle or rectangle tool, or any of several other tools, and create other objects in the display. The user can join these objects to create pictures, such as representations of machine elements and the like. In such systems typically a developing image is displayed in real time, and each element is "remembered" by the drawing program, as well as its placement in the display, and the overall assemblies of atomic elements are remembered as well. The picture may be saved with a file name, copied, printed, sent to others over the Internet network and the like. Any such created drawing may be opened by a user utilizing the object-oriented drawing program that created it, or by another compatible program. There are commercially available object-oriented drawing programs that may open drawing files created by any one of several different programs. There is a wealth of reference literature available regarding object-oriented drawing programs which go into far greater detail than this simple explanation.

A very important distinguishing feature of object-oriented programs is that each element and assembly of elements is remembered as an object. That is, each element and assembly has stored properties, uniquely associated (by an ID number for example). For a straight line the properties may include length, width (line weight), color, dash effects, end treatment (ends may be squared, pointed or rounded, for example. The placement of the line in a particular drawing is remembered as well. This way, when the program is directed to open a drawing file, every element and assembly (objects) in the drawing may be properly rendered in the drawing, by reference to the properties and placement coordinates of the objects.

The present inventor is involved in the technology of computerized gaming, wherein persons (displayed as avatars), mechanical devices, landscapes, structures, water and many other elements may be dynamically displayed, and wherein a player, through input devices like the mentioned pointer device, as well as joysticks, rollers, buttons and the like, and even through hand and body gestures, may influence the movement and activities of avatars and other elements in the game display. In such a game environment physics simulation is used with virtual elements, objects, avatars and the like to create a dynamic image that appears as nearly as possible to conform to real expectations. A ball caused by a player to be struck, like a golf ball, for example, should move in the display, and react with other objects and surfaces as would be expected in the real world. This is, as may be expected, a computer-intensive process, requiring considerable software sophistication and computer power.

In the development of new computer games the present inventor is desirous of providing new and exciting capabilities to players. One such desired capability is for a player to be able to create apparatus (machines) with joined, moving parts, and to save these user-created gadgets as tools, weapons and the like, and to use them in games created by the user or others. A user might wish to create, for example, a jointed throwing stick comprising two rods joined by an elbow, having a cup for a ball on one rod end away from the joint, and a handle for an avatar to grip on the other rod end away from the elbow joint, such that an avatar might place or pick up a ball in the cup, and then throw the ball using the jointed throwing stick, enjoying a considerable mechanical advantage by virtue of the length and the joint of the throwing stick. This is a very simple example of what might be done by a player, if the necessary tools were provided in the gaming software. One might consider also creating vehicles, jet packs, swimming and other water gear for use by avatars in various ways.

In another example, it is a common practice in gaming and other virtual world systems to provide a capability for a player to build landscapes, buildings and other structures, and often standardized "blocks" may be provided for the player to incorporate into such organization. Virtual LEGO is a case in point.

In considering this desire for additional capability, and how it might be provided, the inventor has been aware of the fact that object-oriented drawing programs are in many case very sophisticated, such a Autodesk™ and Solidworks™, by which a designer may create images of very sophisticated machines, and all of the piece parts and sub-assemblies that go together (assemble) to make such a machine. Being that game players in many cases are younger people without engineering training and experience, one challenge is to simplify some of the intensive task flow that is necessary in use of known object-oriented drawing programs. What is clearly needed are software solutions to make it easier and more intuitive for a user to create structures and jointed, moving apparatus in a display, that may then be activated, used, and treated by physics simulation to operate in a gaming or other virtual environment appearing as "real" as possible.

BRIEF SUMMARY OF THE INVENTION

In an embodiment of the invention a drawing system is provided with software (SW) executing on a computerized appliance from a non-transitory medium, the software providing tools to enable a user to create geometric objects in a display, and to select and drag the objects in the display. An assembly engine is a part of the SW, and is enabled to monitor properties of objects and movement of objects in the display. The assembly engine monitors features and properties of a first object selected and dragged, and features and properties of second objects in the display, determines compatible geometric features that might be joined in assembly between the first and second objects, and upon compatible features for join being moved within a preprogrammed threshold distance (TD) in the display, affects a join operation, bringing the compatible features of the first and the second object together in an assembly and redrawing the assembly.

In one embodiment the join operation, once the TD is reached, acts as a snap operation. Also in one embodiment, once an assembly is accomplished, click and drag effects in the drawing system are changed such that dragging an object of the assembly will drag the assembly, and to break the join requires a longer and more rapid drag movement than normal. A drag to break a join must achieve the TD before the join is broken, such that releasing an object within the TD causes the join to reassert, and dragging beyond the TD breaks the join, and causes the drag dynamics to revert to normal.

In some embodiments a user may copy an assembly into a virtual environment having one or more physics engines, and the objects in the assembly will be treated as possessing mass and velocity as properties, and will be moved in a display accordingly, and following assemble constraints.

In another aspect of the invention, in a drawing system having software (SW) executing on a computerized appliance from a non-transitory medium, the software providing tools to enable a user to create geometric objects in a display, and to select and drag the objects in the display, a method is provided for assembly, the method comprising the steps of (a) monitoring features and properties of a first object selected and dragged in the display, and features and properties of second objects in the display by an assembly engine; (b) determining by the assembly engine compatible geometric features that might be joined in assembly between the first and second objects; and (c) upon compatible features for join being moved within a preprogrammed threshold distance (TD) in the display, affecting a join operation, bringing the compatible features of the first and the second object together in an assembly and redrawing the assembly.

In one embodiment of the method the join operation, once the TD is reached, acts as a snap operation. Also in one embodiment, once an assembly is accomplished, click and drag effects in the drawing system are changed such that dragging an object of the assembly will drag the assembly, and to break the join requires a longer and more rapid drag movement than normal. In some embodiments a drag to break a join must achieve the TD before the join is broken, such that releasing an object within the TD causes the join to reassert, and dragging beyond the TD breaks the join, and causes the drag dynamics to revert to normal.

In some embodiments of the method a user may copy an assembly into a virtual environment having one or more physics engines, and the objects in the assembly will be treated as possessing mass and velocity as properties, and will be moved in a display accordingly, and following assemble constraints.

DETAILED DESCRIPTION OF THE INVENTION

Figure 1:
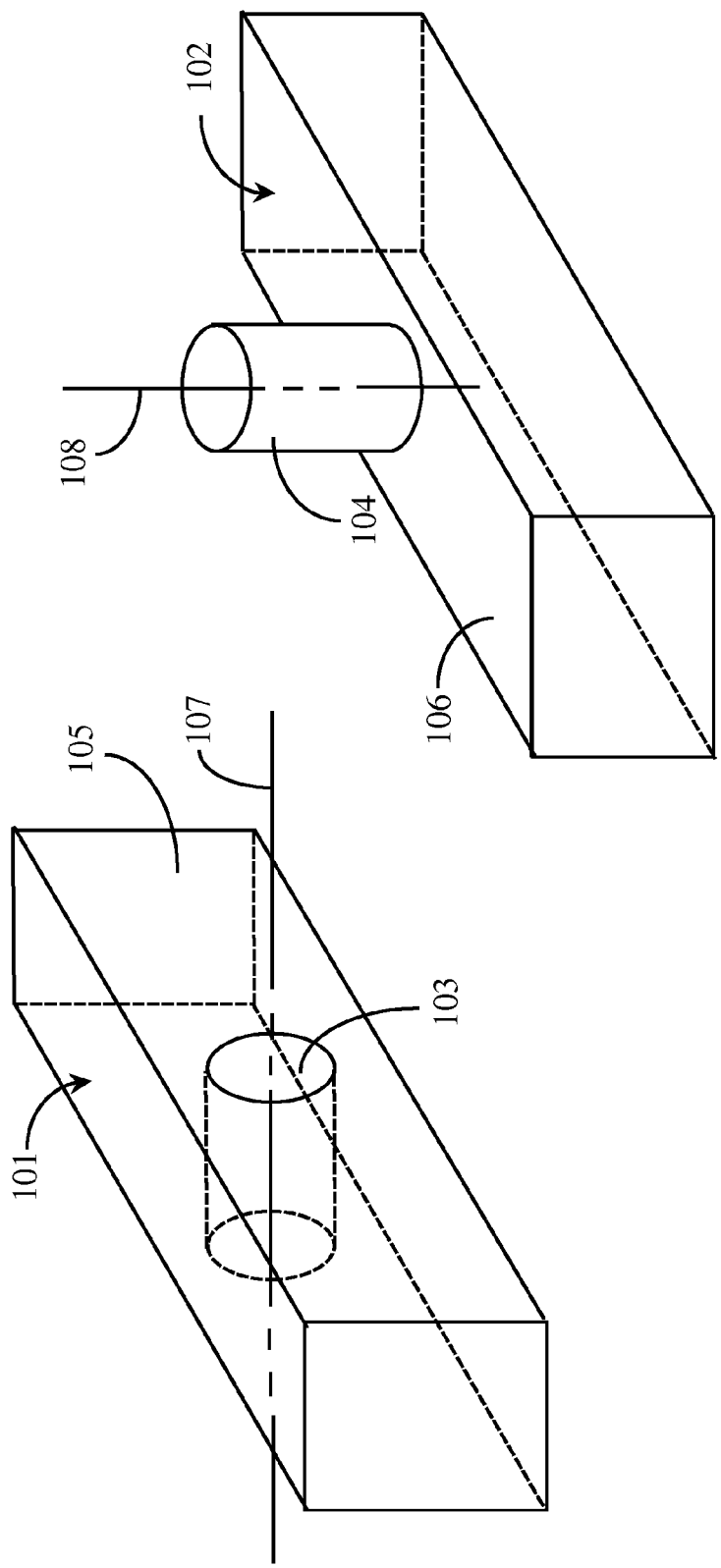
FIG. 1 is an illustration of two objects in a conventional drawing program.

FIG. 1 is an illustration of two objects 101 and 102 in a conventional drawing program, the objects having features that appear to admit to joining the two objects, if such joining might be a goal of a user of the program. Object 101 is a rectangular block having a through-hole 103 from surface 105. Hole 103 has an inside diameter not shown, but certainly a part of the "properties" of the object, stored in a coupled dB. Hole 103 has a longitudinal axis 107 that happens to be perpendicular to surface 105.

Object 102 is quite similar in geometry to object 101, but has a projection 104, that we might term a "knob". Knob 104 has an outside diameter that is a part of the properties for that object, also stored in the coupled dB. Further, cylindrical knob 104 has a length and a longitudinal axis 108.

In conventional art, to join objects 101 and 102 as an assembly, one sets constraints for a join operation. This involves selecting the operation, selecting the two objects to be joined, and constraining how they are to be joined. The constraint in this example is imposed in this example by at least selecting the axes 107 and 108, and asserting that the constraint is to join with the axes co-linear. Then initiating the join causes the objects to align and come together, which will result in knob 104 entering hole 103. The movement may be by the application or by the user. In this example for the join to be accomplished the program must be capable of 3D manipulation, because one or both of the objects will have to reorient for the join to take place.

In a more general sense further constraints might be set. Since the block objects have the same rectangular geometry in this case, a user might also select surfaces 105 and 106 in a constraint to join the surfaces. This will result in the knob entering the hole to an extent that the surfaces are intimately together.

Figure 2:
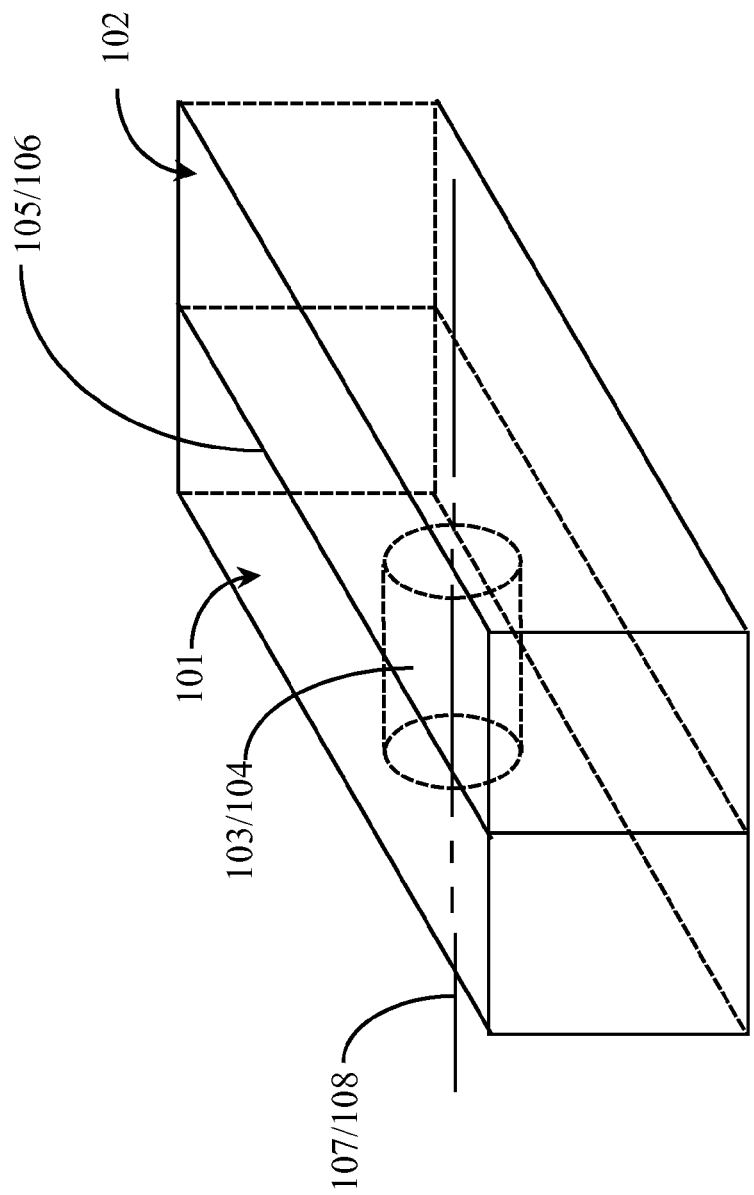
FIG. 2 is shows the two objects of FIG. 1 joined.

FIG. 2 illustrates the result of this conventional join operation. Objects 101 and 102 are joined, such that axes 107 and 108 are co-linear, and surfaces 105 and 106 are adjacent. If the length of knob 104 is longer than the width of object 101 in the properties of the two objects, than knob 104 will project from the "backside of the width of object 101. In the rendition shown it was assumed that the length of the knob is equal to the width of object 101.

The skilled person will understand that this is a very simple example to illustrate the principles and the operations involved. The objects might be much more complicated than the blocks shown in FIGS. 1 and 2, and the operations to join (assemble) might be more complex as well. Differing geometry might also impose additional constraints. But generally speaking the illustration and the description show the principles involved in conventional join operations with conventional drawing programs.

The procedure described above for setting constraints and affecting a join operation is exemplary, and the procedure may vary somewhat from program to program. But the procedure will be quite similar for just about all conventional programs. In point of fact, most conventional programs in the art sub-programs are employed that are provided by third-party enterprises, and may be common to different programs. ACIS™ and Parasolid™, for example provide a geometry engine that is used by different drawing programs. DCubed™ provides a constraint engine. SolidWorks™ and Autodesk Inventor™ provide programming for a 3D system for construction of assemblies and machines. Adams™ and Havok™ provide a physics engine by which objects, including assemblies and machines, may be dynamically treated in a display as though they have mass and velocity. Different drawing programs in the art may use one or more of these subsystems. This is not to say that licensed sub-systems are required. There is no real obstacle to programmers providing every necessary function in a single robust and unique program.

Figure 3:
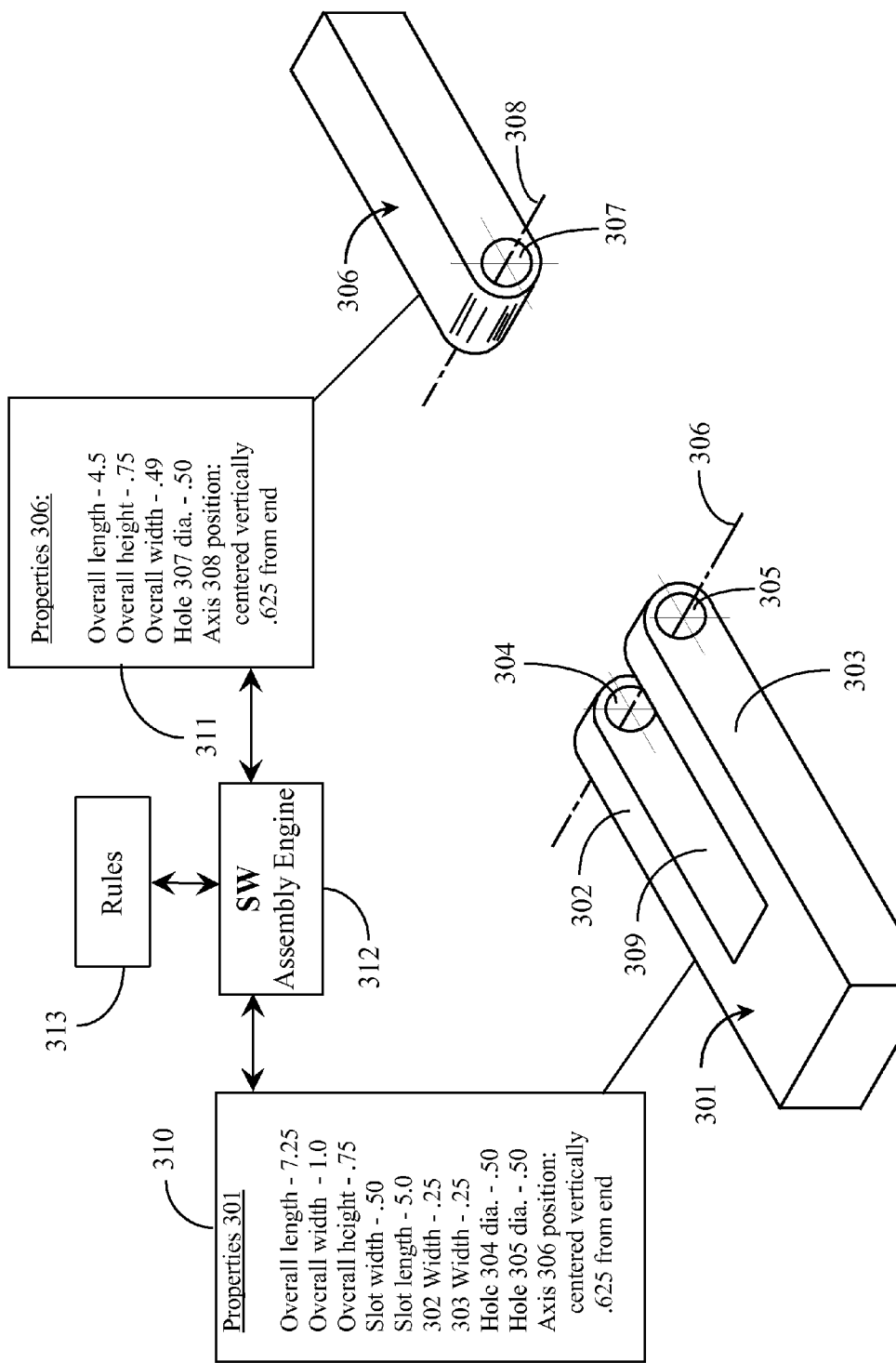
FIG. 3 illustrates two objects and join operations in an embodiment of the present invention.

In an embodiment of the present invention constraints for join are set automatically by reference to geometry, and in some embodiments by further reference to user behavior, rather than manually by selecting object elements and constraints, then moving selected objects to join. FIG. 3 is an illustration of two objects 301 and 306. Object 301 is a forked element having two arms 302 and 303 separated by a slot 309. Arms 302 and 303 are equal in width and length, and each have a rounded end with a hole (304 and 305). The holes have the same diameter, and are aligned with a common axis 306.

Object 306 in FIG. 3 is a single arm with a rounded end and a hole near the rounded end, the hole having an inside diameter the same as holes 304 and 305 of object 301. The height of object 306 is the same as object 301, and the width of object 306 is slightly less than the width of slot 309 of object 301.

It is quite well known in the art that every atomic element, grouped collection of elements, object, and assembly in a drawing has a stored set of properties. The properties are generated as objects are created in the drawing program and saved. This is necessary, including the orientation and placement of objects in a drawing, because, for example, if a drawing file is closed, and then subsequently reopened, it is by reference to the stored properties that the drawing can again be displayed, edited or printed. Further still, one very valuable technique in drawing programs is to be able to duplicate elements and objects, and copy them to, for example, into other drawings.

In FIG. 3 properties for object 301 are shown in box 310, and properties for object 306 are shown in box 311. Again, this is exemplary only, and these properties are not normally shown in a display of a drawing, and may be kept and ordered differently in different drawing programs.

In this example the parts were drawn originally having dimensions such that they might be assembled. This is not a limitation in the invention, which will operate regardless of the geometric nature of objects, but will aid in description of the invention. The width of object 306 was made to be 0.49 units, so it would slip conveniently into slot 309 of object 301, should a user wish to make that assembly.

In an embodiment of the present invention, a user might select one of objects 301 and 306, and move the selected object. For sake of description assume that object 306 is selected. In an embodiment of the invention a SW Assembly Engine 312 of the overall SW of the drawing program begins to monitor properties of selected object 306 and the drag behavior of the user. This Assembly Engine is unique to the present invention, and if operates any time a user selects and drags an object. In some embodiments the Assembly Engine may be enabled and disabled by the user.

Now the user drags object 306 toward object 301. The direction of drag is considered as intent by Assembly Engine 312, and the Assembly Engine begins to monitor properties of object 301 as well as those of object 306, because the user is dragging object 306 toward object 301. In some embodiments the user might select both objects before moving one toward the other, in which case the intent by direction is not necessary. In some other embodiments, only one object might be selected and dragged, and the direction toward another object, and a certain distance to the other object might both be used to infer intent. In either of these cases, once the intent is determined the properties of both objects are being monitored.

SW 312, as drag continues identifies features of both objects 306 and 301 that are compatible for joining the two objects, and properties of the features considered. In some embodiments there are rules 313 governing how joins may be made, and in some embodiments the rules are subject to edit and configuration by a program provider or a user.

As a working example, assume the user has selected object 306 and has dragged object 306 a short way directly toward object 301. SW 312 considers this movement as user intent to possibly join the two objects. This intent may have been determined by separation closing to a pre-programmed distance. As the drag of object 306 toward object 301 continues SW 312 considers compatible join features in the properties of the two objects. Several different possible join scenarios may be considered. SW 312 may, for example, consider that object 306 and object 301 each have flat outer surfaces that might be joined in certain ways without impediment. There are five such surfaces on each of the objects. Joining of surfaces between the two objects may take many different forms, with further possible constraints concerning edges and/or corners of surfaces.

SW 312 may determine that there are two holes in object 301 and one in object 306 that are of the same inside diameter. This may be considered as join scenario with a certain probability.

Figure 4:
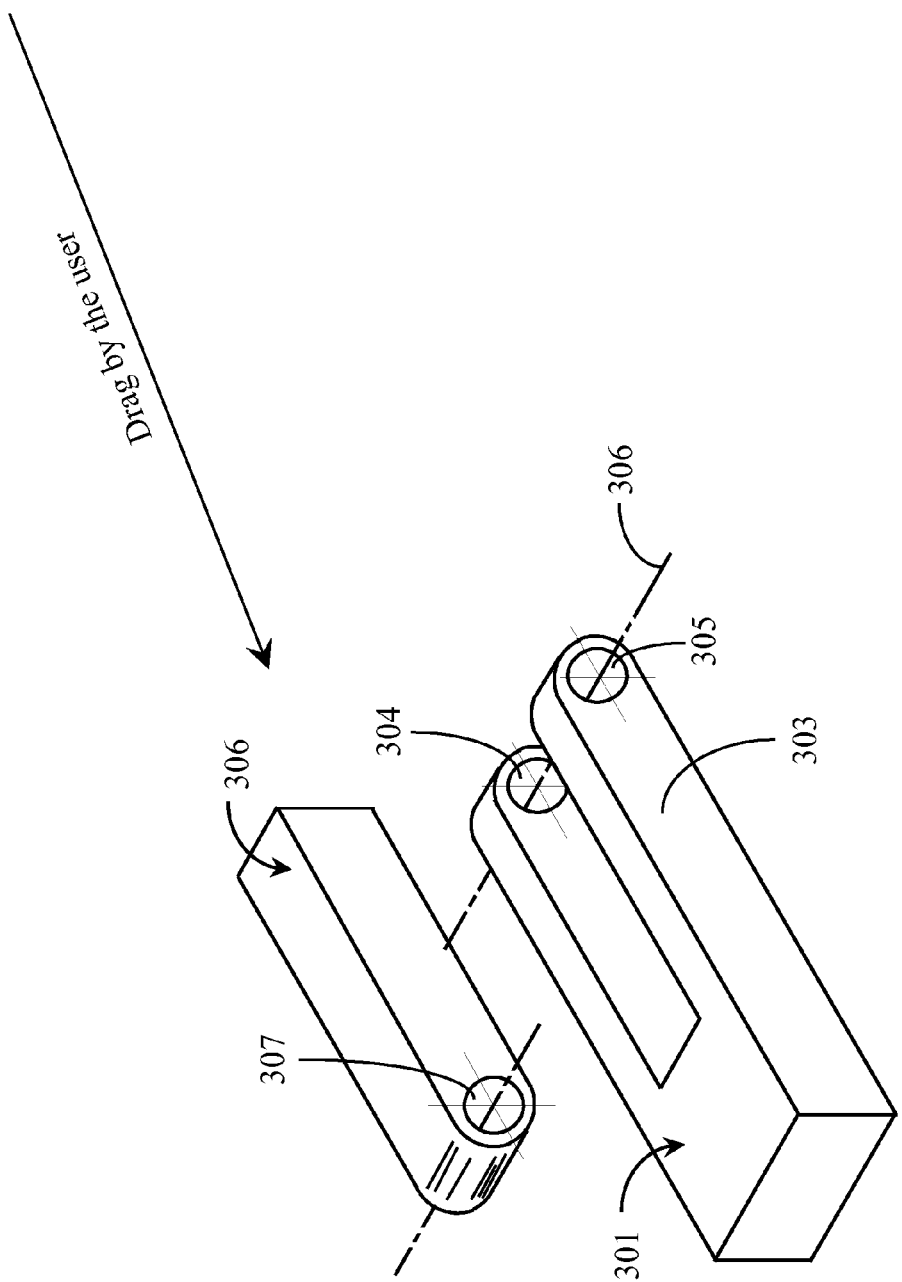
FIG. 4 illustrates one of the objects in FIG. 3 moved to a specific position relative to the other.
Figure 5:
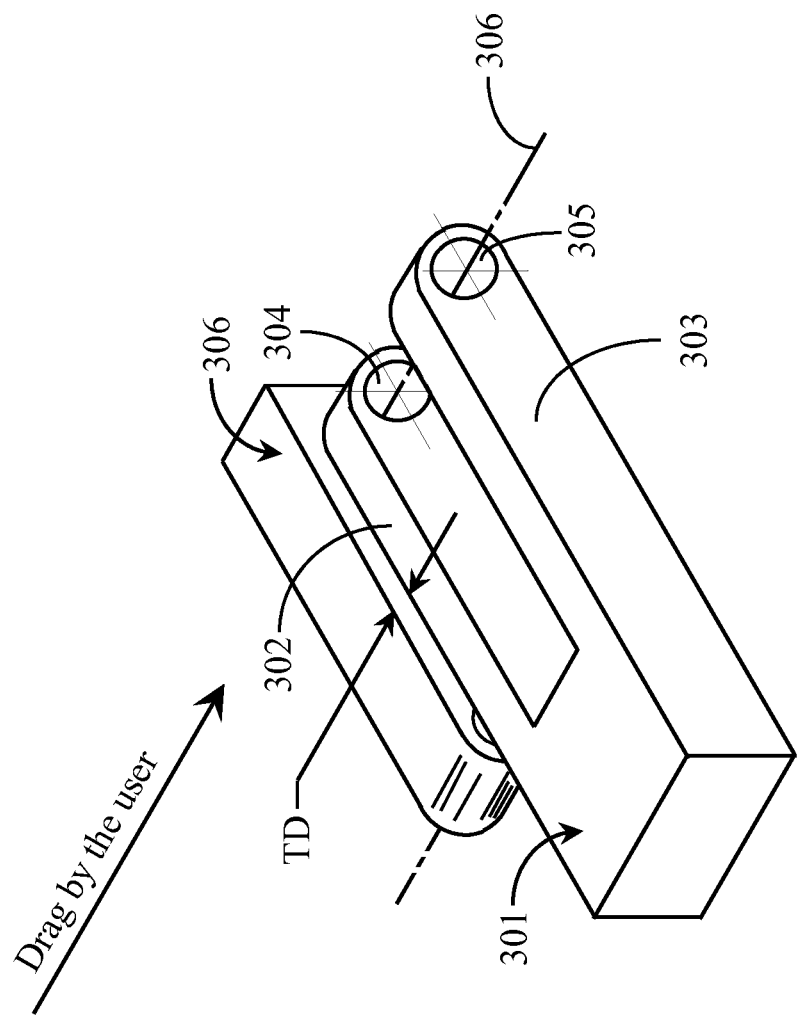
FIG. 5 illustrates a further drag operation concerning the objects of FIGS. 3 and 4.
Figure 6:
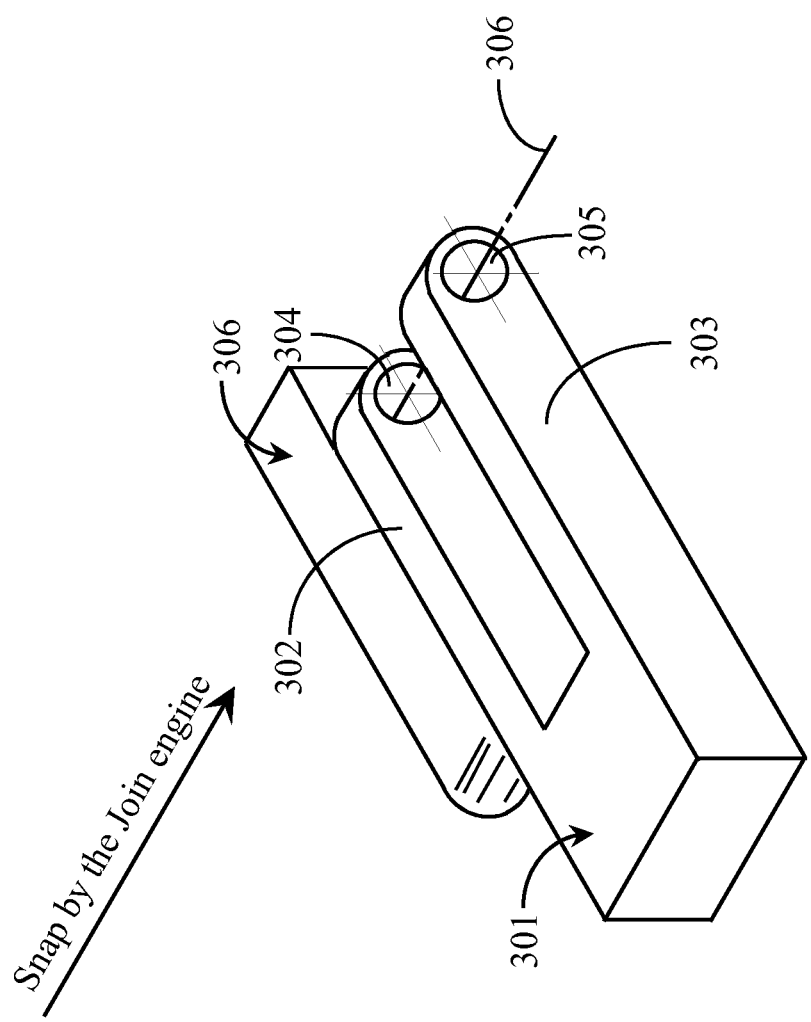
FIG. 6 illustrates the objects of FIGS. 3, 4 and 5 joined.

An important operation in some embodiments of the invention is that the user's behavior in moving one of the objects toward the other object effects the probabilities of the many different join possibilities. If the user, for example, moves object 306 with axis 308 parallel to axis 306, but moves object 306 to the far side of object 301, as seen in FIG. 4, the rules engine working with SW 312 will focus on a higher probability that the user intends to join the objects with the facing surfaces. FIG. 5 illustrates that the user has continued to drag object 306 toward object 301, and has closed the separation to a small dimension, labeled TD. As this occurs the SW increases the probability that the intent is to join by the facing surfaces. As the user drags object 306 and the object separation reduces to the pre-programmed threshold distance (TD) as shown in FIG. 5, the assembly engine of the invention finishes the intended join by joining the facing surfaces as shown in FIG. 6. The final short move and placement from the TD separation to the joined aspect, with the necessary redrawing of some of the features of object 306 is accomplished as a "snap" adjustment, quite similar to the "snap-to-grid" operation of many drawing programs, when that feature is enabled.

Once the join is accomplished the user may modify it. For example, the user may select object 306 and drag it left, right or up or down in a plane with the facing surfaces joined, and release it to a new position. The user may undo the join by dragging object 306 away from object 301 or 301 away from 306, but the system will resist that operation by changing the cursor speed relative to pointer movement. The user will have to move the cursor a significantly greater distance in a direction to separate the objects to cause any separation, and the user will have to move the pointer at an initially rapid rate to effect any movement of the object. And if the user lets go within the threshold distance the objects will again snap to join. If the user drags one away from the other beyond the threshold distance the join is broken, and the dragged object can be released leaving it away from the previously joined object, and subject to drag by normal cursor and pointer movement.

If the user drags object 306 after the join in a direction in the plane of the joined surfaces and toward closing the separation of another feature that the SW determine is a valid join constraint, the system will focus on the possibility and probability of the new join constraint. Suppose the movement is toward aligning hole 307 in object 306 with hole 304 in object 304. Object 306 will move readily in the restrained plane, and if the holes become close by the threshold distance, the join will be affected with the holes aligned as well as the surfaces joined. The final adjustment will be a snap, as before.

Edges and corners as well will be recognized by the Join engine in embodiments of the invention as well as holes and surfaces, as will other features that may be common enough in the properties of each object for the Join engine to focus on, and increase probability by determining intent by the user's behavior in click-and-drag.

Figure 7:
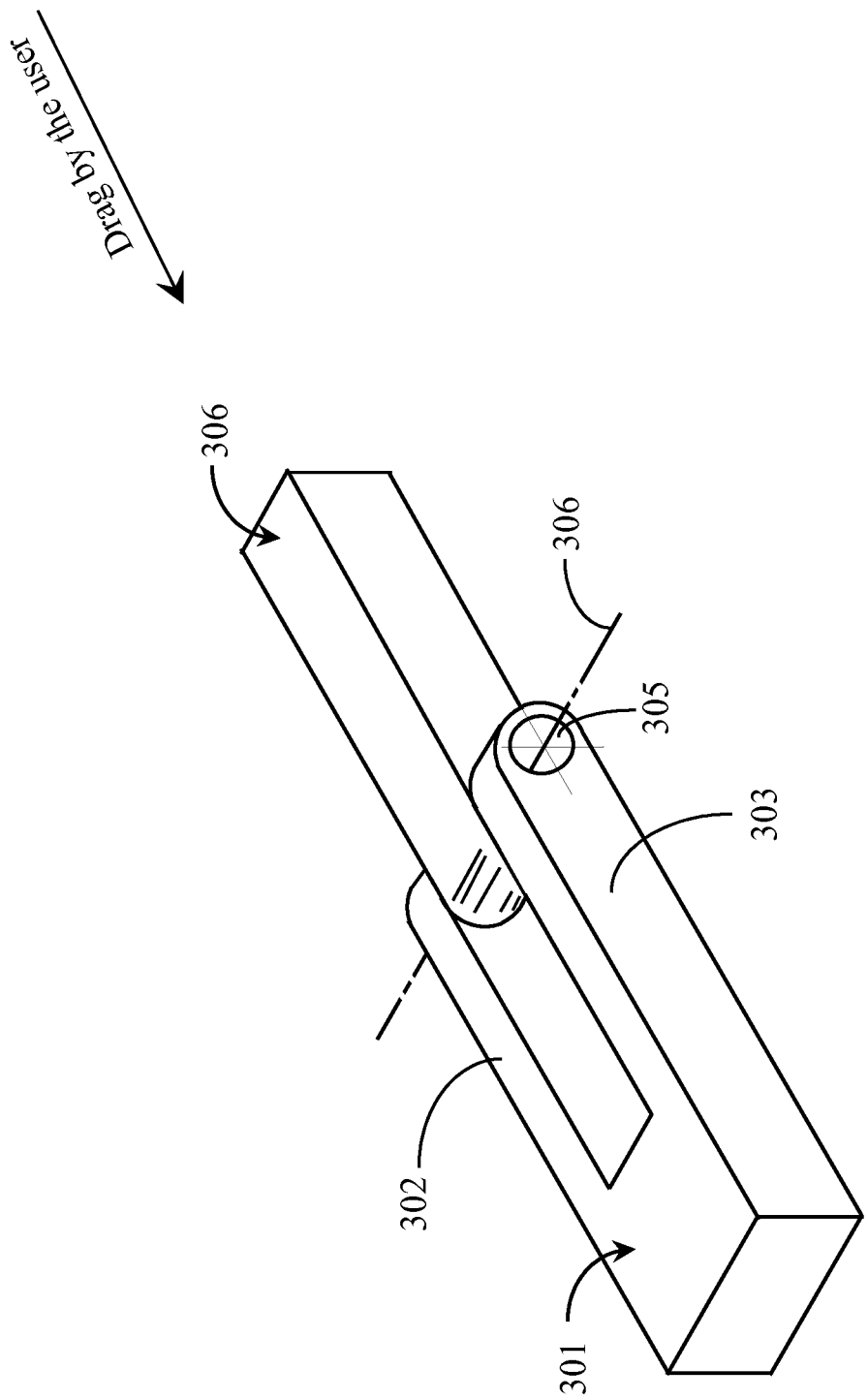
FIG. 7 illustrates the two objects joined in a different way.

The user may move object 306 to the opposite side of object 301, may reverse the direction of the rounded end of object 306, may move object 306 above or below object 301, and effect joins in a similar manner as described above with reference to FIGS. 4, 5 and 6. A user may also join these two objects with object 306 fitted within slot 309 by dragging object 306 toward object 301, and directing the rounded end of object 306 into the slot. As object 306 approaches object 301 the assembly engine will focus more on this particular join relationship as the most likely (higher probability), such that as object 306 reaches object 301 the Join engine will act to cause object 306 to enter the slot, which may require small adjustments in object placement in the display by the SW rather than by the user. The user should notice little effect except that object 306 will smoothly enter the slot, and the join is made. The user can leave object 306 at any place he or she might choose in slot 309, but the join engine will focus, for example, on hole 307 in object 306 and holes 304 and 305 in arms 302 and 303 of object 301, and if the TD is achieved, will snap position to align the holes. If it is the user's intent to accomplish the join with the holes aligned, the user only needs to move the objects so that the holes are within the TD, and the assembly engine will finish the job. FIG. 7 illustrates the objects with this join accomplished.

In the joined aspect as shown in FIG. 7 the system will resist moving one object out of the joined aspect, by changing the cursor effects as described above. Normally dragging one object of the assembly will drag the assembly. The user, may however, rotate object 306 around object 301 with axis 306/308 as the axis of rotation, even though there is no axle or hinge shaft in the aligned holes. The user may, by quickly moving the cursor a longer distance break the join by moving a constraint beyond the TD. From the aspect of FIG. 7 the user may slide object 306 in slot 309 if the cursor resistance is overcome, but object 306 joined in this manner may not be rotated about an axis in the direction of its length, or moved in the direction of axis 308 without also rotating or translating object 301. The SW takes the object features into account to restrain movements that would not be possible with real objects.

Figure 8:
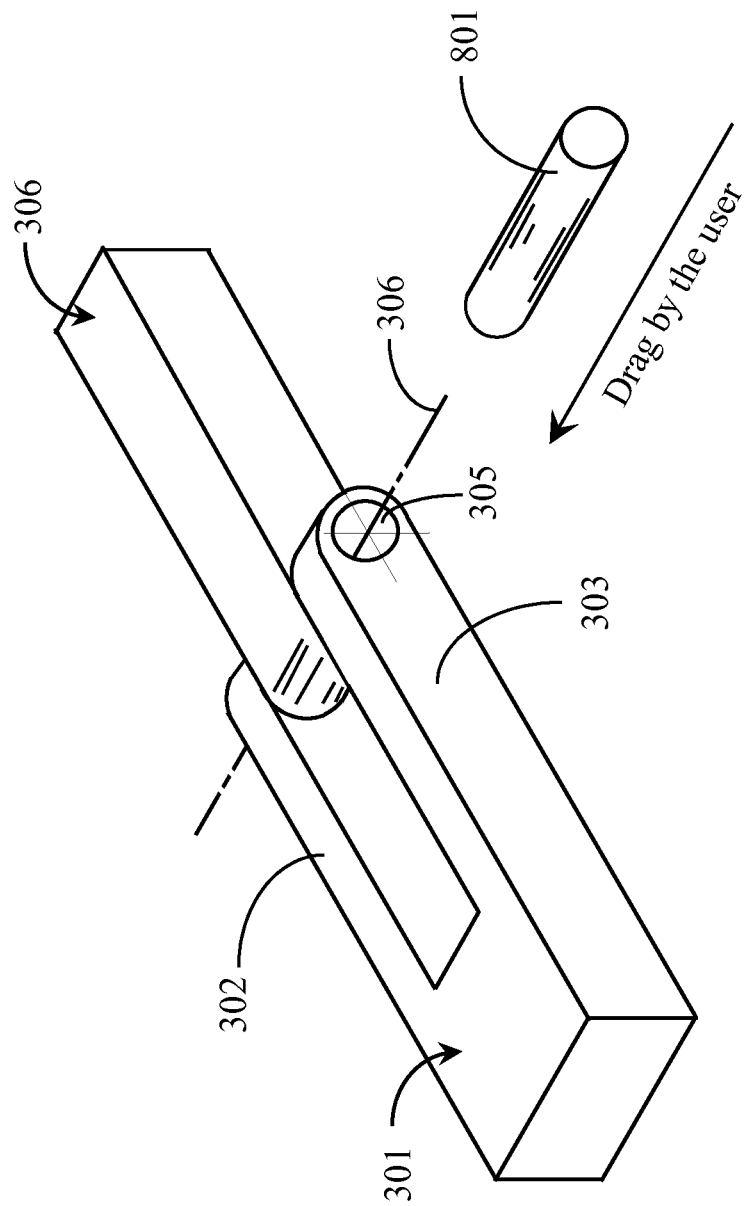
FIG. 8 illustrates a further shaft object to be added to the assembly created.

If a close-fitting shaft object is joined to the assembly of objects 306 and 301 through the aligned holes 304, 305 and 307, then moving object 306 can only cause rotation of 306 around axis 306/308 relative to object 301, unless the shaft object is removed. FIG. 8 illustrates such a shaft object positioned to follow the join procedure in an embodiment of the invention. The join will be accomplished in the same way by dragging shaft object 802 toward the aligned holes of joined objects 306 and 301 as was described above. It is needed that the outside diameter of the shaft be nominally less than the OD of the holes for the join to be accomplished, and the SW will know if the properties admit or do not admit to a join.

Once the shaft is assembled, then, as described briefly above, objects 306 and 301 may freely rotate about one another around the rotation axis constrained by shaft 801. A difference now is that the user cannot break objects 306 and 301 apart by a more energetic drag, as would be possible if the shaft were not assembled.

Although the objects described in embodiments above are rather simple, and only a simple rotating joint has be described, the descriptions are rather long and seem a bit complicated. In operation, however, the system works rapidly, and the user may accomplish joins very rapidly and intuitively with a minimum of manipulation. The assembly engine of the invention simply monitors the drag and drop behavior of the user, follows any rules that may be set, determines most likely objects and constraints for join, checks the objects' properties for compatible features, and accomplishes the user-directed joins according to geometry.

It should be noted that users of a drawing program enhanced with an assembly engine according to an embodiment of the present invention may, of course, drag and drop objects for other purposes than joining the objects in assembly. The assembly engine simply works in the background, and if the user does not move objects within the TD, the user notices no effect of the assembly engine. The user in such a circumstance quickly becomes aware of the programs behavior, and can use the enhanced features intuitively.

In an embodiment of the invention a drawing program enhanced with an assembly engine according to an embodiment of the present invention is provided to players of video games and participants in virtual worlds. In one embodiment a user, having access to the program of the invention, may create vehicles, watercraft, weapons, and other machinery that he or she may use in the virtual world or video game. Once a machine is created and assembled, it may be displayed in the virtual environment, and it will be acted upon by one or more physics engines in the virtual environment to behave as having mass and velocity, and will respond to induced forces according to the laws of physics. For example, the pivoted assembly described above may be a part of a tractor assembly, and the user may add springs and motive devices attached to parts in different ways. Object 306 might be an arm of a backhoe, for example, and the arm will behave as though it has weight, and the weight will have to be supported by some force-producing element, or it will fall, rotating around the pivot shaft. Force-producing elements may be commanded in various ways in such an environment to cause dynamic activity of assemblies.

It was described above that objects have properties, and SW 312 will consult properties of the objects to determine whether there are features that may be joined. The user will need to create the objects to have compatible properties, or will have to find and copy objects that have compatible properties to effect desired assemblies. In one embodiment libraries of parts may be provided with different properties. There may, for example, be a library of shaft objects available to a user to accomplish joins to make hinged assemblies. There might be in the library shafts of different diameters in small increments, and length in small increments. There may be a search function as well for the user to use to find an already-created shaft of desired length and diameter to copy into his or her drawing. There is no particular limit to the size of such libraries, and users may choose to donate new parts created to such a library, where the new objects may be catalogued and made available to others.

In yet another embodiment of the invention an assembly engine might alter properties of an object to suit a join determined to be desired by a user. For example, having joined objects 306 and 301 with 306 in slot 309 and the holes aligned, the user may select a generic shaft and copy it into his drawing. In this embodiment, as the user drags the shaft toward the holes, and the system of the invention determines with a high probability that the user intends that the shaft join in the holes to finish the hinge joint, the system in this embodiment may resize the length and outside diameter of the shaft to be suitable. The same functionality might be used to adjust the width of object 306 to fit nicely into slot 309, or may adjust the width of the slot and the width of object 306 to be suitable. There are many such possibilities.

A skilled person will recognize that the embodiments described are exemplary, and may be accomplished in a number of different ways, and alterations may be made in embodiments without departing from the spirit and scope of the invention. In an embodiment of the invention, the system notes compatible features between two objects and joins the objects accordingly. The features may be of many different sorts. For example, one object may have a knob and the other a hole, and the join may be with the knob in the hole. The knob and the hole may have any one of a variety of shapes, and the system spots compatible shapes that may be joined. One may have a ball socket and the other a ball, and the join will be a ball-and-socket assembly. A weld constraint may be included, and in some cases the system may ask the user at some point in the manipulation of one or both objects, which of several available "smart constraints" may be desired. The user in this case can select. The breadth of the invention is limited only by the claims that follow.

The invention claimed is:

1. A drawing system comprising:
a computerized appliance having a processor and coupled to a data repository;
software (SW) executing on the processor from a non-transitory medium, the software providing tools to enable a user to create geometric objects in a display, and to select and drag the objects in the display; and
an assembly engine as a part of the SW, enabled to monitor geometric features of objects and movement of objects in the display caused by click-and-drag operations performed by the user;
wherein, upon the user selecting to click and drag a first object in the display, the assembly engine monitors geometric features of the first object, and while the system monitors direction of drag of the first object by the user, the system also monitors geometric features of second objects positioned in the direction of the drag and determines a probability of intent to join with a second object in the direction of drag based on compatibility of joining geometric features of the first and second objects, and selects one of the second objects to join as a result of increasing the probability of intent to join when compatibility to join geometric features of the first and second objects are identified, and the first and second objects being moved within a preprogrammed threshold distance (TD) greater than zero in the display, brings the compatible features of the first and the second object together creating an assembly with stored properties and redraws the assembly.

2. The drawing system of claim 1 wherein the join operation, once the TD is reached, acts as a snap operation.

3. The drawing system of claim 1 wherein, once an assembly is accomplished, click and drag effects in the drawing system are changed such that dragging an object of the assembly will drag the assembly.

4. The drawing system of claim 3 wherein a drag to break a join must achieve the TD before the join is broken, such that releasing an object within the TD causes the join to reassert, and dragging beyond the TD breaks the join, and causes the drag dynamics to revert to normal.

5. The drawing system of claim 1 wherein a user may copy an assembly into a virtual environment having one or more physics engines, and the objects in the assembly will be treated as possessing mass and velocity as properties, and will be moved in a display accordingly, and following assemble constraints.

6. A method for assembling objects in a drawing system having software (SW) executing on a processor of a computerized appliance from a non-transitory medium, the software providing tools to enable a user to create geometric objects in a display, and to select and drag the objects in the display, the method comprising the steps of:
(a) monitoring, by an assembly engine as part of the software, at least geometric features of a first object selected and dragged in the display and direction of drag of the first object selected and dragged, and at least geometric features of second objects in the display that are determined by the assembly engine to be in the direction of drag of the first object;
(b) determining by the assembly engine compatible geometric features that might be joined in assembly between the first and second objects;
(c) determining a probability of intent to join with a second object in the direction of drag based on compatibility of joining geometric features of the first and second objects;
(d) upon compatible features for join being identified by the assembly engine between the first and second objects, selecting one of the second objects to join as a result of increasing the probability of intent to join when compatibility to join geometric features of the first and second objects are identified, and
(e) as the first object is moved within a preprogrammed threshold distance (TD) greater than zero from the second object in the display, affecting a join operation, bringing the compatible geometric features of the first and the second object together in an assembly and redrawing the assembly.

7. The method of claim 6 wherein the join operation, once the TD is reached, acts as a snap operation.

8. The method of claim 6 wherein, once an assembly is accomplished, click and drag effects in the drawing system are changed such that dragging an object of the assembly will drag the assembly.

9. The method of claim 8 wherein a drag to break a join must achieve the TD before the join is broken, such that releasing an object within the TD causes the join to reassert, and dragging beyond the TD breaks the join.

10. The method of claim 6 wherein a user may copy an assembly into a virtual environment having one or more physics engines, and the objects in the assembly will be treated as possessing mass and velocity as properties, and will be moved in a display accordingly, and following assemble constraints.

11. The drawing system of claim 1 wherein the join may be broken by a rapid click-and-drag movement, providing the original first and second objects separately in the display.

12. The method of claim 6 wherein the join may be broken by a rapid click-and drag movement, providing the original first and second objects separately in the display.

* * * * *